United States Patent [19]

Bengtsson et al.

[11] 4,272,553

[45] Jun. 9, 1981

[54] PROCESS FOR PREPARING COATED FRIED VEGETABLES

[75] Inventors: Bengt L. Bengtsson; Jörgen Fonskov, both of Bjuv, Sweden

[73] Assignee: Produits Findus S.A., Vevey, Switzerland

[21] Appl. No.: 46,220

[22] Filed: Jun. 7, 1979

[30] Foreign Application Priority Data

Jun. 13, 1978 [CH] Switzerland .......................... 6423/78

[51] Int. Cl.³ .............................................. A21D 6/00
[52] U.S. Cl. ..................................... 426/241; 426/102; 426/293; 426/296; 426/510
[58] Field of Search ................ 426/439, 438, 289, 290, 426/241, 296, 509, 510, 511, 441, 291, 302, 96, 102, 293

[56] References Cited

U.S. PATENT DOCUMENTS

| | | | |
|---|---|---|---|
| 3,078,172 | 2/1963 | Libby | 426/438 |
| 3,085,020 | 4/1963 | Backinger et al. | 426/438 |
| 3,527,646 | 9/1970 | Scheick | 426/289 |
| 3,578,463 | 5/1971 | Smith et al. | 426/241 |
| 3,586,512 | 6/1971 | Mancuso et al. | 426/289 |
| 3,649,305 | 3/1972 | Wilder | 426/241 |
| 3,723,137 | 3/1973 | Fischer et al. | 426/293 |
| 4,109,020 | 8/1978 | Gorfien et al. | 426/438 |

*Primary Examiner*—Joseph M. Golian
*Assistant Examiner*—George C. Yeung
*Attorney, Agent, or Firm*—Watson, Leavenworth, Kelton & Taggart

[57] ABSTRACT

The invention is concerned with a process for the preparation of fried vegetables, particularly fried vegetables to be frozen.

The process comprises coating pieces of the vegetable with a starch-containing product, blanching the coated pieces with steam and deep fat frying the coated and blanched pieces.

12 Claims, No Drawings

PROCESS FOR PREPARING COATED FRIED VEGETABLES

The present invention is concerned with a process for the preparation of fried vegetables, particularly fried vegetables to be frozen.

Fried potatoes including French fried potatoes are produced according to strict specifications both with regard to the raw material used and to the conditions in the various processing steps. In order to achieve a final product of good quality the potato raw material should have a high dry matter content and a low content of reducing sugars. In conventional processing of French fried potatoes the potatoes are peeled, trimmed and cut into strips. The strips are blanched in one or two steps at specific temperatures, dipped in a solution of glucose, fried in oil, drained, and finally frozen.

In this conventional process the composition of the raw material is crucial. The dry matter content should be more than 20% by weight, because if the dry matter content is low, the frying time must be increased in order to obtain the required dry matter content in the finished product. The increased frying time results in a lower yield and in an increased fat content in the final product. Furthermore if the potato raw material is stored at temperatures below +7° C. there will be an accumulation of reducing sugars in the raw material. A high content of reducing sugars will result in an objectionably browned product after frying.

In the conventional process the frying is carried out for 1.5 to 3.0 minutes in order to obtain an acceptable product. A shorter frying time would result in an unacceptable texture, but would be desirable as it would result in less fat absorption and hence a final product with a lower fat content.

One drawback with French fries produced according to the conventional method is that the texture changes rapidly after reheating of the frozen product. Just after reheating (in oil, pan or oven) the product is quite crisp and shows a good texture, but it is not stable for on cooling it becomes limp and soggy.

Some attempts have been made to improve the textural quality of conventionally produced French fries by coating the potato strips with a hydrocolloid before deep fat frying. The hydrocolloid may be ungelatinized unmodified high amylose corn starch. The use of a gelatinized, modified or unmodified alkyl cellulose ether, modified starch or modified alginate has also been proposed. The hydrocolloid may also be gelatinized high amylose corn starch, amylose obtained by fractionation of potato starch or modified amylose.

A drawback of these methods, however, is that the potato strips are always blanched in hot water or in a hot calcium lactate solution before being coated.

In the process, the blanching step is essential to inactivate the enzymes, for if the enzymes are not inactivated, enzymatic reactions will continue in the frozen state and cause an off-flavour and texture deteriorization. During blanching solids are leached from the treated material into the blanching water, removing some of the natural flavour. It will also remove some nutrients and especially water soluble vitamins, i.e. ascorbic acid. Moreover, the disposal of the blanching water presents serious problems because of its high content of organic solids, requiring treatment in a waste water plant.

The conventional process used for French fries has not been applied to other vegetables, because of their low dry matter content and/or high content of reducing sugars. In order obtain a product with a crisp texture, a long frying time would be needed resulting in low yield, objectionable degree of browning and excessive fat content.

We have found that frozen French fries and other fried vegetables can be prepared which do not have the above-mentioned disadvantages.

The invention provides a process for the preparation of fried vegetables which comprises coating pieces of the vegetables with a starch-containing product, blanching the coated pieces with steam and deep fat frying the coated and blanched pieces.

In carrying out the process, the vegetables may be peeled if necessary, trimmed, washed and cut into strips or pieces or left whole depending on the size and form which is desired. The vegetables which may be processed include potato, carrot, onion, turnip, rutabaga, celery, parsnip, red beet, egg-plant, squash, vegetable marrow, cauliflower, Brussels sprout, mushroom, etc. The vegetable pieces can be fresh or in a frozen state. They can also be reconstituted, i.e. compressed and shaped from slivers or odd-shaped pieces of vegetable.

The individual vegetable pieces are then coated before being blanched, which is the basic feature of the process.

The coating may be carried out in one or two steps. The simplest way is to just apply a dry coating direct onto the wet surface of the pieces. The coating may be applied in continuous manner using conventional dusting equipment. As coating any of the following may be used: wheat or other cereal flours, soy or other oil seed flours, natural or modified starches from various raw materials, potato granules or potato flakes, potato fibres or other fibrous by-products, protein concentrate or isolate from various raw materials, bread crumbs or corn flake crumbs, stabilizers and thickeners, e.g. agars, alginates, celluloses, gelatine, gums, pectins, etc. These different substances may be used alone or in different combinations. The most important property of the coating is that it should adhere to the vegetable and be able to absorb steam condensing during blanching.

It should also absorb the water migrating from the inside of the product. The coating seals the surface effectively thereby preventing drip losses. To obtain a crispy texture on frying it is important that the coating be capable of holding all the water migrating from the inside of the vegetable during the frying procedure and the condensed steam.

A preferred coating material comprises a mixture of potato granules and wheat flour, desirably in proportions (by weight) of 50–90% potato granules and 10–50% wheat flour.

Corn flake crumbs also give good results when combined either with flour or with flour and starch. Thus the potato granules can be entirely or partly replaced by corn flakes. Examples of mixtures giving good results are 50% corn flake crumbs/50% wheat flour and 20% corn flake crumbs/50% wheat flour/30% potato granules by weight.

Besides the main components of the coatings mentioned above, small amounts of reducing sugar may be added in order to modify the colour of the coating during frying. Salt and spices may also be added as desired.

After cutting into pieces, the vegetables have exposed wet surfaces and to these a certain amount of dry coating will adhere. If this amount of coating is insufficient the pieces may be dipped in a fluid batter in order to increase the uptake of dry coating.

In this case the coating is applied in two steps. In the first step the vegetable is dipped in a batter of high viscosity and then a dry coating is applied as described above. The two-step coating technique is advantageous when frozen raw material is used to facilitate adhesion of a dry coating.

The thickness of the coating affects the storage stability of the product. A very thin coating leads to a more rapid loss of crisp texture during frozen storage as only small amounts of water need to migrate from the interior of the product to the coating before the water content of the coating attains equilibrium with the rest of the product.

Conversely a product with a thick coating does not have particularly desirable eating qualities since the coating dominates the vegetable part. A coating thickness in the range of 0.5–2.5 mm, depending on the size of the vegetable piece is generally suitable, the range of 1.2–1.5 mm being preferred.

Desirably, the amount (by weight) of coating added represents 4 to 15% of the vegetable, 7 to 10% being preferred. These ranges apply both to dry coating alone or in combinations with fluid batter. When batter is used it represents up to 10%, preferably up to 5%.

The coating is preferably applied on a continuous line and the application time is normally in the range of 5–30 seconds, depending on the type of equipment.

The coated pieces are blanched in steam, preferably at atmospheric pressure, for example on a belt blancher or on a fluidized bed blancher. Other conventional steam blanchers are also suitable. The steam condenses on the surface of the pieces and the condensate is absorbed by the coating. In this manner the losses of solids are almost entirely eliminated.

The blanching operation may also be carried out in a microwave tunnel in an atmosphere of steam. One advantage of the microwave treatment is the considerable reduction in processing time resulting from the fact that the heat is generated within the interior of the product whereas other heating methods rely on the conduction of heat from the surface inwards. Microwave heating by itself, however, has an undesirable dehydrating effect. By combining microwave heating and steam the above-mentioned desirable properties of the coating are preserved.

The blanching time should be sufficient to give a product with negative peroxidase activity and will generally be in the range of 1 to 5 minutes depending on the type of equipment used and type and dimensions of raw material.

After blanching, the product is deep fat fried, usually for 0.5 to 1.5 minutes at 180° to 200° C., about 185° C. during 60–90 seconds being preferred.

During frying, the water content of the coating is reduced resulting in a crisp surface. Since the coating has a high dry matter content, the frying time may be shorter than in the conventional process and still give a product with a crisp surface. The shorter frying time will result in a lower fat uptake which again is advantageous for the texture.

After frying, the pieces are drained and frozen in conventional manner.

Alternatively, the pieces may be cooled and frozen directly after blanching. For consumption, the frozen pieces are deep fat fried at about 185° C. for about 3 minutes. In this case, about 1.5 minutes are used for thawing the product to normal temperature and about 1.5 minutes for frying.

The frozen, fried product, however, is preferred. It may be reheated in any convenient manner, e.g. in an oven, in oil, or by pan frying. One of its advantages is that a very crisp surface is obtained irrespective of the reheating method used. Moreover, the pieces are very stable, and may be kept for long periods without loss of crispness, whereas conventional products will be limp and soggy shortly after reheating. When the products are kept warm, the quality remains stable and they are therefore suitable for catering purposes.

Another very important advantage of the new method is the increased yield. The total yield for the conventional process is normally in the range of 40 to 65%, while the total yield for the new process is in the range of 75 to 90% depending on type of coating and blanching and frying times and temperatures. Moreover, flavour and nutrient, including vitamin losses are also reduced.

After freezing, the frozen product may be packed in bulk into large bags or cartons for later repacking, or directly packed into consumer packs, such as cartons or plastic bags.

The following examples are given for the purpose of illustration only. The percentages are by weight.

EXAMPLE 1

Potatoes are washed, peeled and cut into French fry strips of 10 mm × 10 mm cross-section. 100 kg of strips are treated with a coating containing 90% potato granules and 10% wheat flour. The coating strips are blanched with steam for 2 minutes and deep fat fried for 60 seconds at 185° C. Finally the strips are frozen to −30° C. The weight of frozen strips is 95 kg. For consumption the strips are heated in an oven at 225° C. for 15 minutes. The reheated product has a stable crisp surface texture.

EXAMPLE 2

Potatoes are treated as in Example 1 up to the blanching and then cooled in air and frozen to −30° C. 100 kg of strips are used, and the weight of frozen strips is 120 kg. For consumption the strips are deep fat fried for 3.0 minutes at 185° C. The fried product has a stable crisp surface texture.

EXAMPLE 3

Potatoes are washed, peeled and cut into dice. 100 kg of dice are then treated as the strips in Example 1. The weight of the frozen dice is 100 kg. The frozen dice are mixed with frozen diced meat, frozen diced onion and spices. For consumption the mix is heated in an oven at 225° C. for 30 minutes. The potato dice have a stable crisp surface texture.

EXAMPLE 4

Carrots are washed, peeled and cut into strips of 10 mm × 10 mm cross-section. 100 kg of strips are coated with a mixture of 70% wheat flour and 30% corn starch. The coated strips are blanched with steam for 4 minutes and then deep fat fried for 90 seconds at 180° C. The strips are then frozen to −30° C. The frozen strips weigh 95 kg. For consumption the strips are heated in an oven at 200° C. for 20 minutes. The heated product has a stable crisp surface texture and a golden brown colour.

EXAMPLE 5

100 kg frozen cauliflower florets are dipped in a batter containing 30% whole eggs, 10% milk powder, 9% salt, 1% white pepper and 50% water and then coated with corn flake crumbs. The florets are blanched with steam for 2 minutes and then fried for 90 seconds at 185° C. Finally the florets are frozen to −30° C. The weight of the frozen florets is 110 kg. The florets are mixed with French fries, baby carrots and onion rings, all coated, fried and frozen according to this invention. The vegetable mix is heated in an oven at 225° C. for 15 minutes. All the different vegetables have a stable crisp surface texture.

EXAMPLE 6

For comparison purposes carrots strips are treated:
1. According to a conventional process, comprising blanching for 6 minutes at 80° C. in water, dipping in 1.75% glucose solution for 1 minute at 85° C. and deep frying 2 minutes at 180° C.
2. According to the process of Example 1
3. According to the process of Example 5, except that fresh carrot raw material is used and a mixture of 90% potato granules/10% wheat flour applied as coating to the batter.

The yield figures for each trial are given in Table I whereas Table II indicates the vitamin C content, the dry matter content and the organoleptic evaluation.

move excess dip solution and deep fat frying for 1.5 minutes at 177° C.
2. According to the conventional process described in item 1 of Example 6.
3. According to the process of Example 1.
4. According to the process described in item 3 of Example 6.

The yield figures for each trial are given in Table III whereas Table IV indicates the vitamin C content, the losses of solids during blanching, the dry matter content of final product after freezing and the organoleptic evaluation.

TABLE III

| Trial No. | Raw material used, kg | Product weight after application of batter, kg | Product weight after application of dry coating, kg | Product weight after blanching, kg | Product weight after dipping, kg | Product weight after frying, kg | Product weight after freezing, kg |
|---|---|---|---|---|---|---|---|
| 1. | 100 | — | — | 95.2 | 116.2 | 68.6 | 67.4 |
| 2. | 100 | — | — | 95.4 | 93.7 | 62.2 | 61.0 |
| 3. | 100 | — | 108.3 | 117.8 | — | 89.4 | 88.2 |
| 4. | 100 | 99.6 | 108.5 | 118.3 | — | 89.9 | 89.0 |

TABLE IV

| Trial No. | Losses of solids during blanching as percentage of total solids of strips | Vitamin C content of final product after freezing (mg/100 g) | Dry matter content of final product after freezing (%) | organoleptic* evaluation Surface texture | Flavour |
|---|---|---|---|---|---|
| 1. | 5.0 | 17 | 37.1 | 5.2 | 7.0 |
| 2. | 3.1 | 17 | 37.6 | 5.2 | 6.8 |
| 3. | 0.1 | 20 | 41.7 | 7.2 | 7.0 |
| 4. | 0.1 | 20 | 42.4 | 7.4 | 7.0 |

*8 point scale; 8 excellent, 5 barely acceptable; 1 poor

EXAMPLE 8

The various vegetable raw materials are treated as

TABLE I

| Trial No. | Raw material used, kg | Product weight after application of batter kg | Product weight after application of dry coating kg | Product weight after blanching kg | Product weight after dipping kg | Product weight after frying kg | Product weight after freezing kg |
|---|---|---|---|---|---|---|---|
| 1. | 100 | — | — | 88.2 | 86.6 | 44.1 | 43.0 |
| 2. | 100 | — | 108.6 | 117.9 | — | 75.7 | 73.5 |
| 3. | 100 | 103.0 | 110.2 | 118.2 | — | 83.9 | 81.4 |

TABLE II

| Trial No. | Vitamin C content of final product after freezing; (mg/100 g) | Dry matter content of final product after freezing; (%) | Organoleptic* evaluation Surface texture | Flavour |
|---|---|---|---|---|
| 1. | 7 | 25.6 | 3.8 | 5.2 |
| 2. | 10 | 37.6 | 7.2 | 6.2 |
| 3. | 12 | 37.8 | 6.2 | 6.6 |

*8 point scale, 8 excellent, 5 barely acceptable, 1 poor.

EXAMPLE 7

For comparison purposes potato strips are treated:
1. According to a known process comprising blanching in water for ten minutes at 75° C., dipping the potato pieces during 26 seconds at 75° C. in a solution containing 1.0% dextrose, 1.0% sodium acid pyrophosphate and 6.5% AMYLOMAIZE VII (which is an ungelatinized unmodified high amylose starch available from American Maize Products Company), shaking to reindicated in Table V below. The vegetables are dipped in a batter solution based on 31% whole eggs, 6% skim milk powder, 2.4% salt, 0.6% white pepper and 60% water and coated with a mixture of 50% wheat flour, 30% potato granules and 20% corn flake crumbs. The various coated vegetables are then blanched with steam for 2 minutes and fried for 90 seconds at 185° C. Finally, the fried vegetables are frozen to −30° C. For consumption the frozen vegetables are heated in an oven at 225° C. for 7–15 minutes, depending on size of the vegetable pieces. All reheated vegetables have a stable crisp surface texture, a golden brown colour and an excellent flavour retention.

TABLE V

| Vegetable raw material | Treatment |
|---|---|
| Brussels sprouts | Washed and freed of bitter taste |
| Celery | Washed, peeled and cut into strips of 10 × 10 mm cross-section |
| Egg-plant | Washed and cut into dice of 16 × 16 × 10 mm. |

TABLE V-continued

| Vegetable raw material | Treatment |
|---|---|
| Mushrooms | Washed |
| Onions | Washed, peeled, oriented and sliced in 5 mm thickness and separated into rings |
| Parsnip | Washed, peeled, oriented and sliced in 6 mm thickness |
| Red beet | Washed, precooked for 20 minutes, peeled and cut into strips of 10 × 10 mm cross-section |
| Rutabaga | Washed, peeled and cut into dice of 16 × 16 × 10 mm |
| Turnip | Washed, peeled and cut into strips of 10 × 10 mm cross-section |
| Squash | Washed, oriented and sliced in 6 mm thickness |
| Vegetable marrow | Washed and cut into strips of 10 × 10 mm cross-section. |

We claim:

1. A process for the preparation of fried vegetables which comprises:
   (a) coating raw or frozen pieces of the vegetables either
      i. in one step with a starch-containing product in dry state comprising a mixture of potato starch and cereal flour or a mixture of cereal flour and bread crumbs or corn flakes crumbs or a mixture of cereal flour, potato starch and bread or corn flakes crumbs; or
      ii. in two steps with a fluid batter and then with a starch-containing product as defined in (i) above;
   (b) blanching the coated pieces with steam for 1 to 5 minutes; and then
   (c) deep fat frying the coated and blanched pieces for 0.5 to 1.5 minutes at 150° C. to 200° C.

2. A process according to claim 1 in which the vegetables are raw or frozen pieces of potato, carrot, onion, turnip, rutabaga, celery, parsnip, red beet, egg-plant, squash, vegetable marrow, cauliflower, brussels sprout and mushroom.

3. A process according to claim 1, in which the starch-containing product is a mixture comprising by weight 50–90% potato granules and 10–50% wheat flour.

4. A process according to claim 1, in which the starch-containing product is a mixture comprising by weight about 50% corn flake crumbs and about 50% wheat flour.

5. A process according to claim 1, in which the starch-containing product is a mixture comprising by weight about 20% corn flake crumbs, about 50% wheat flour and about 30% potato granules.

6. A process according to claim 1, in which the amount of coating added represents 4 to 15% by weight of the vegetables treated.

7. A process according to claim 6, in which the amount of coating added represents 7 to 10% by weight of the vegetables treated.

8. A process according to claim 1, in which the batter added represents up to 10% by weight of the vegetables treated.

9. A process according to claim 8, in which the batter added represents up to 5% by weight of the vegetables treated.

10. A process according to claim 1, in which the coated vegetable pieces are blanched in a microwave tunnel in an atmosphere of steam.

11. A process according to claim 1, in which the coated and blanched vegetable pieces are deep fat fried for 60 to 90 seconds at about 185° C.

12. A process according to claim 1, in which the fried vegetable pieces are drained and frozen.

* * * * *

UNITED STATES PATENT AND TRADEMARK OFFICE
CERTIFICATE OF CORRECTION

PATENT NO. : 4,272,553
DATED : June 9, 1981
INVENTOR(S) : Bengt L. Bengtsson, et al.

It is certified that error appears in the above—identified patent and that said Letters Patent is hereby corrected as shown below:

The assignee in the title page of the patent "Produits Findus S.A., Vevey, Switzerland" should read --Societe d'Assistance Technique Pour Produits Nestle S.A., Lausanne, Switzerland--.

At Col. 2, line 2, after "order", insert --to--.

Table V, at col. 7, line 18, "in 6 mm thickness" should be set forth under the sub-heading entitled "Treatment" after the word "sliced".

Signed and Sealed this

First Day of December 1981

[SEAL]

Attest:

GERALD J. MOSSINGHOFF

Attesting Officer · Commissioner of Patents and Trademarks